United States Patent
Taylor et al.

(10) Patent No.: US 7,438,824 B2
(45) Date of Patent: Oct. 21, 2008

(54) FABRICATION OF LONG RANGE PERIODIC NANOSTRUCTURES IN TRANSPARENT OR SEMITRANSPARENT DIELECTRICS

(75) Inventors: Rod Taylor, Gloucester (CA); Paul Corkum, Gloucester (CA); Ravi Bhardwaj Vedula, Ottawa (CA); Eli Simova, Gloucester (CA); David Rayner, Ottawa (CA); Cyril Hnatovsky, Ottawa (CA)

(73) Assignee: National Research Council of Canada, Ottawa, On (CA)

( * ) Notice: Subject to any disclaimer, the term of this patent is extended or adjusted under 35 U.S.C. 154(b) by 116 days.

(21) Appl. No.: 11/277,381

(22) Filed: Mar. 24, 2006

(65) Prior Publication Data
US 2006/0219676 A1    Oct. 5, 2006

Related U.S. Application Data

(60) Provisional application No. 60/644,946, filed on Mar. 25, 2005.

(30) Foreign Application Priority Data

Jul. 19, 2005    (CA)    ................................. 2512327

(51) Int. Cl.
*B44C 1/22*    (2006.01)
(52) U.S. Cl. .............. 216/62; 216/37; 216/67; 430/290; 430/321; 430/945
(58) Field of Classification Search ............ 216/62; 430/290; 372/25
See application file for complete search history.

(56) References Cited

U.S. PATENT DOCUMENTS

| 6,573,026 B1* | 6/2003 | Aitken et al. | 430/290 |
| 2003/0223695 A1* | 12/2003 | Li et al. | 385/39 |
| 2005/0226287 A1* | 10/2005 | Shah et al. | 372/25 |

OTHER PUBLICATIONS

C.W.Hee, Optics & Laser Technology, 37, (2005), pp. 93-98.*
J. Koch, Optical Engineering, vol. 44(5), (2005), pp. 051103-1-051103-5.*
K. Itoh, RIKEN Review, No. 50 (Jan. 2003), pp. 90-94.*
Self-Organized Nanogratings in Glass Irradiated by Ultrashort Light Pulses—Physical Reviews—Dec. 12, 2003 vol. 91, No. 24, pp. 1 to 4.
Study of Damage in Fused Silica Induced by Ulta-Short IR Laser Pulses—Sudrie, Franco et al—Optics Communications—May 8, 2001, pp. 333 to 339.
Optically Produced Arrays of Planar Nanostructures Inside Fused Silica—V.R. Bhardwaj, E. Simova et al—Physical Review Letters—Feb. 10, 2006—pp. 1 to 4.

(Continued)

*Primary Examiner*—Norton Nadine
*Assistant Examiner*—Maki Angadi
(74) *Attorney, Agent, or Firm*—Marks & Clerk; Richard J. Mitchell (57) ABSTRACT

To make high quality long-range periodic nanostructures in a transparent or semi-transparent substrate, the transparent or semi-transparent substrate is scanned with a linearly polarized laser beam generated by a femtosecond laser and exceeding a predetermined energy/pulse threshold along a scanning path. Sub-diffraction limit structures are formed as periodic planes of modified material in the transparent or semi-transparent substrate extending along the scanning path. The modified material can then be chemically etched to form cavities.

45 Claims, 6 Drawing Sheets

OTHER PUBLICATIONS

Polarization-Selective Etching in Femtosecond Laser-Assisted Microfluidic Channel Fabrication in Fused Silica -C Hnatovsky, R.S. Taylor et al—Jul. 15, 2005—pp. 1867 to 1869.

Long-Range Periodic Planar Nanostructures Produced in Glass by Femtosecond Laser Dielectric Modification—C. Hnatovsky—CThVI—3 pages.

Three-Dimensional Optical Storage Inside Transparent Materials—E.N. Glezer, M Milosavljevic—Dec. 15, 1996—Optics Letters—pp. 2023 to 2025.

Pulse Duration Dependence of Femtosecond-Laser -Frabricated Nanogratings in Fused Siliva—C. Hnatovsky & R.S. Taylor—Applied Physics Letters 87 published Jun. 29, 2005.

* cited by examiner

FABRICATION OF LONG RANGE PERIODIC NANOSTRUCTURES IN TRANSPARENT OR SEMITRANSPARENT DIELECTRICS

CROSS REFERENCE TO RELATED APPLICATION

This application claims the benefit under 35 USC 119(e) of U.S. provisional application no. 60/664,946 filed Mar. 25, 2005, the contents of which are herein incorporated by reference.

FIELD OF THE INVENTION

This invention relates to the field of nanotechnology, and in particular to a method of making long-range periodic nanostructures inside transparent or semi-transparent dielectrics.

BACKGROUND OF THE INVENTION

Periodic structures of nanometer dimensions but with long-range order (at least mms) inside transparent materials such as fused silica and other optical glasses have a variety of applications. Optical methods, such as femtosecond (1 fs=$10^{-15}$ s) laser dielectric modification (FLDM), for fabricating such structures have advantages over traditional micro-fabrication techniques which for the most part only allow the fabrication on a surface and not inside the bulk material. In fact FLDM is the only viable technique capable of forming controllable 3-D structures inside bulk glasses (see "Methods for creating optical structures in dielectrics using controlled energy deposition" by Corkum et al, PCT WO/02/16070 A2 28 Feb. 2002, allowed as a US patent as of February 2005), and "Optically wiring discrete optical components and optical arrays using 3-D waveguide circuits written in transparent materials" by Taylor et al, U.S. patent application Ser. No. 10/826,312 filed 19$^{th}$ of Apr. 2004). FLDM can also be used directly to produce structures that have a refractive index contrast with the surrounding material or in combination with chemical etching to produce channels and shaped voids.

Traditionally it has been assumed that optical fabrication techniques are restricted by the diffraction limit of the light used. Typically, this means that optical techniques cannot be used to produce structures with dimensions of less than the order of a wavelength of the light ($\lambda$). Near-field optical approaches provide ways to avoid the diffraction limit but are restricted to forming nanostructures at surfaces and do not permit the fabrication of such structures within the body of a substrate. At high peak laser powers and near the threshold for modification of a dielectric modified zones can be formed that are somewhat smaller than the wavelength of light. The applicants have recently shown that an intrinsic property of FLDM under defined irradiation conditions is that the process can result in sub-diffraction limit structures. *Femtosecond laser fabrication of nanostructures in silica glass*, Taylor, R. S.; Hnatovsky, C.; Simova, E.; Rayner, D. M.; Bhardwaj, V. R.; Corkum, P. B., *Opt. Lett.* 28, 1043-1045, (2003). There has also been some evidence in the literature that self-organized sub-features in the modified zone can be produced with a dimension of ≈20 nm that is dependent on the light polarization. *Self-Organized Nanogratings in Glass Irradiated by Ultrashort Light Pulses*, Y. Shimotsuma, P. G. Kazansky, J. Qiu and K. Hirao *Phys. Rev. Lett.*, 91(24), 247405 (2003). The polarization dependent periodic nano-features were observed in fused silica within the material exposed to the static focus of a femtosecond laser i.e. neither the sample nor the focus were scanned. The prior art however does not teach how to harness these sub-structures to produce useful assemblies, especially long-range arrays.

Moreover, Shimotsuma et al. describe a model for the formation of the nanofeatures that is based upon the interference of the incident focused light with a bulk electron plasma wave formed by multiphoton ionization inside the dielectric material. The applicants believe this model is incorrect and leads to erroneous predictions. Shimotsuma et al. assume that a plasma is formed at very high electron densities very close to the critical density $N_{cr}$ (i.e. when the plasma frequency=laser frequency) and at high electron temperatures (>$1 \times 10^7$ K.). Interference between the incident light and the electron plasma wave gives rise to periodic bulk electron density variations in the plane of the laser polarization which leads to the observed nanostructures.

However high electron densities close to the critical density are not possible due to non-linear absorption and electron recombination which limits the density to ≈$0.1 N_{cr}$. It is impossible to produce such densities because absorption would severely limit the length of the modified zones (<1 micron) whereas we see modified structures with lengths of tens of microns.

The required electron temperatures are unrealistic under his experimental conditions i.e. inside a dielectric where electron-ion collisions reduce the mean temperature <$1 \times 10^7$ K.

A realistic 3-D treatment of Shimotsuma et al's 1-D model would result in electrons moving out of the focal volume in all directions, not with a unique velocity but with a distribution of velocities. This would make a host of plasma waves possible with different momentum vectors and there is no a-priori reason why the system would choose a particular plasma momentum vector to form a grating of specific spacing.

Shimotsuma et al obtain agreement between their model and their experimental data which shows a strong dependence of the grating spacing on the laser pulse energy. After analyzing considerably more data and much higher quality data than Shimotsuma et al, the applicants have observed that the spacing is independent of the pulse energy contrary to Shimotsuma et al and believe that their experiment is not representative.

The applicants have experimental data which shows that the spacing decreases linearly with a decrease in the laser wavelength. Shimotsuma has no experimental data on wavelength scaling but his model predicts a highly non-linear scaling relationship.

It is not intuitive how the spacing could be preserved from the Shimotsuma model when the focal spot is moved since there is no feedback mechanism apparent in the model. Indeed since it is a plasma mechanism it is not clear how the phase can be locked during sample motion.

SUMMARY OF THE INVENTION

According to the present invention there is provided a method of making high quality long-range periodic nanostructures in a transparent or semi-transparent substrate, comprising generating a linearly polarized, pulsed femtosecond high repetition rate laser beam, said laser beam having an energy per pulse exceeding a predetermined energy threshold ($E_{th}$), dependent on the nature of the substrate; bringing said laser beam to a focus within the body of said transparent or semi-transparent substrate; and scanning said transparent or semi-transparent substrate with said linearly polarized laser beam along a scanning path to create sub-diffraction limit structures comprising periodic slabs of modified material oriented orthogonal to the direction of the laser polarization and extending along said scanning path in said transparent or semi-transparent substrate.

Specifically the applicants have discovered that, focussing linearly polarized laser light above a well defined energy/pulse threshold, which depends on the nature of the substrate, the numerical aperture of the focusing optic and on the laser pulse duration, can produce permanent sub-wavelength spaced periodic nanostructures imbedded in the dielectric material. In this application long-range periodic structures refers to nanostructures fabricated over distances d>>λ and with an essentially fixed spacing (period) between each nanostructure. Furthermore the periodic modified structures also refered to as nanoslabs, nanoplanes and nanogratings can be in the form of voids or nanocracks. These structures are essentially permanent and are still present after annealing the material at 900° C. In the case of fused silica for pulse durations <150 fs and at pulse energies near 50 nJ the dielectric modification is uniform, however at a certain pulse energy ($E_{th}$) the dielectric modification can transform from uniform volume modification into periodic slabs of modified material. Under certain conditions the slabs are <20 nm thick and are orthogonal to the laser polarization direction and extend for most or all of the full length of the laser focus when the laser focus is scanned across the material. When the substrate is fused silica, the pulse energy is typically in the range $E_{th}$ to $4 \times E_{th}$. Surprisingly, contrary to what would be expected, as the sample is scanned the relative motion of the laser beam and the substrate with movements typically less than 1 nm between laser shots does not inhibit or wash out the formation of the structures as a result of a hitherto unrecognized feedback mechanism.

Embodiments of the invention harness these periodic nanostructures to produce useful assemblies, especially long-range arrays; control their dimensions; transform the nanostructures consisting of high index of refraction difference regions into nano-formed dielectric structures suitable for applications such as photonic band-gap devices; and control the nanostructure formation to improve FLDM waveguide and micro-fluidic channel fabrication. A particularly exciting application is the ability to directly write (i.e. without a mask) Bragg gratings or other interesting periodic nanostructures inside optical waveguides such as telecom fibers. The Bragg gratings are formed in continuous fashion with sub-wavelength grating-plane periodicities without having to program the laser and/or the nanopositioning unit to directly write each plane. This is very different from what is taught in US patent application US 2004/0071420 A1 Pub. Date Apr. 15, 2004 by Sezerman et al. In that patent the focal region of a femtosecond laser beam is swept across the fiber core to create a modified zone of higher index of refraction. The laser beam is interrupted as the fiber or laser beam is scanned then allowed to irradiate the sample creating a different modified zone at a predetermined separation from the first zone. Continuation of this process results in the formation of a grating. However the width of the modified slab is determined by the width of the focused laser beam (typically ≧1 micron). This limits the pitch of the gratings to being greater than the wavelength of light. In our case very narrow (<20 nm) grating slabs are formed with periodicities much smaller than the wavelength of light without interrupting the laser beam. Such gratings when fabricated at an angle to the fiber axis could be used as a fiber tap to direct a small portion of the light out of the fiber to be detected to determine the power level inside the fiber. These polarization controlled nano-gratings could be written in small segments of the fiber and used to sample and monitor the polarization states of the light traveling through the fiber i.e. an all-fiber polarimeter. Light scattering from the sub-wavelength gratings could also be used as a controlled means of attenuating light traveling in a fiber i.e. an all-fiber optical attenuator.

The inventors have found that one method of altering the nanoslab periodicity, which is especially important for Bragg grating applications, is to vary the laser wavelength. Periodic nanostructures have been produced with the second harmonic of the 800 nm light, i.e. at a wavelength of 400 nm. The periodicity was reduced by a factor of two approximately linearly with the wavelength and according to a λ/2n relationship (λ wavelength; n refractive index of the dielectric) which will be discussed later. It should be possible to increase the nanoslab periodicity by using a longer wavelength laser source such as an optical parametric amplifier. This will allow the fabrication of periodic nanoslabs with spacings of interest to telecom applications.

In order to form the periodic structures, the laser pulse energy should be above a well defined threshold, which is likely different for different glasses or doped glasses. For fused silica the threshold depends on the laser pulse duration. For pulse durations above 200 fs the threshold is about 75 nJ. For shorter pulse durations the threshold is progressively higher. This is probably due to a requirement for a minimum time to establish a grating pattern over a single laser pulse. On the other hand if the pulse duration is too long (say >200 fs) there is a growing tendency to non-uniform modification. A reasonable operating window for the fabrication of high quality periodic nanostructures includes pulse durations from about five fs up to 200 fs. For a given pulse duration there is an approximately 300 nJ operating window above the threshold for high quality grating-like slabs. For a given pulse duration at higher pulse energies there is a trend to greater background modification between the grating-like structures; a reduction in the length of the grating-like structures (e.g. in the direction of light propagation) and a greater possibility of non-uniform damage occurring. The laser repetition rate divided by the sample scan rate is a measure of the energy dosage (at fixed pulse energy) delivered to the sample i.e. number of laser shots per micron of scan. At the higher number of shots/micron (say ≧1000) the grating like patterns exhibit sharper features with less modification between them. The increased number of shots per micron of scan reinforces the grating like structures. The inventors have also observed a smaller spacing of the nanoslabs at a high number of laser shots/micron permitting the mean periodicity to be changed from 600 nm to approx. 150 nm, for example, as the scan rate is reduced from 990 μm/s to 1 μm/s at fixed energy per pulse (e.g. 300 nJ) and laser repetition rate (100 KHz). The smaller periodicities (<240 nm) were generally observed only in the top part (i.e. towards the lens) of the modified structures. The laser repetition rate determines how many pulses are delivered to the sample in one second of scanning. It is believed that there is a very broad operating window for nano-grating formation from 1 Hz all the way to MHz rates.

Periodic grating-like structures occur for linear polarizations but do not occur for circular polarization. In the case of circular polarization smooth modification observed at low pulse energies (50-100 nJ) becomes disruptive (>150 nJ) leading to the formation of randomly spaced nanovoids within a uniform modified zone. The degree of "porosity" of the nanovoid loaded modified structures increases with pulse energy. Indeed at high pulse energies (≧1 μJ) the porosity is such that it is possible for individual voids to connect with one another to form a convoluted channel on a scale of mms which fluid can traverse without the need of any chemical etching. This can also be accomplished with linear polarized light with the laser polarization perpendicular to the scan direction and with pulse energies between 1 µJ and 2 µJ. However in this case vertical planar nanocracks assist in fluid flow to the rest of the porous regions providing overall improved fluid transmission. The linkage of these nanostructures may be very useful for making arrays of filters for biomolecules, since the tortuous path of the opened channel which winds its way through the material combined with its nanoscale dimensions may allow only certain mobile biomolecules to pass through. It may also be possible to apply a voltage between the entrance and exit of the channel for micro-electrophoresis applications.

For the linear polarizations the orientation of the periodically modified slab structures is 90° with respect to the direction of the laser polarization. Therefore, the orientation of the grating like patterns can be controlled with the choice of polarization. The orientation of the grating like planes (slabs) can be used to produce polarization selective chemical etching which is a whole new way of controlling etching in dielectric materials (see "Polarization selective chemical etching in femtosecond laser-assisted microfluidic channel fabrication in fused silica" by Hnatovsky et al (Opt. Lett. 30 (14),1-3 (2005).

An interesting phenomenon occurs at high pulse energies (>×10 the threshold for uniform modification) when the sample is polished in the x-y plane (parallel to the scan direction) to <10 µms above the top of the modified structures. The applicants observed the formation of a single nanocrack with a thickness of approximately 50 nm emanating from the apex of the modified structures and connecting to the polished surface. The nanocrack follows the laser writing path and can therefore be controlled in the x-y plane. The nanocrack occurs for both linear and circular laser polarizations. The inventors believe that polishing so close to the apex region relieves the build-up stress at the apex creating a nanocrack to the surface. Such a high aspect ratio (length can be mms) nanocrack might be useful as an ultranarrow nanofluidic channel for biosensing applications.

The applicants have also made the important observation that it was possible to write a new grating in place of an existing grating. The orientation of the new grating planes was perpendicular to the new laser polarization direction. This has been accomplished for both spot (fixed focus) irradiation as well as for continuous scanning. It is believed that using a similar irradiation dosage to that used to form the original grating erases the first grating then replaces it with a second set of grating planes oriented perpendicular to the polarization direction of the rewrite beam. The ability of being able to write micron sized grating voxels inside glass in combination with a rewrite capability makes this technique attractive for 3-D data storage applications, particularity in the area of creating secure encryption codes. If the dosage of the rewrite beam is substantially lower than the write beam, it is possible to have both the write and rewrite sets of grating planes present in the material opening up the possibility of 2-D photonic crystal applications.

Because the periodic nanostructure formation process is a fundamental process, the inventors believe that it should also be possible to make similar nanostructures in other transparent or semi-transparent dielectrics such as sapphire provided the optimum parameter space is identified. It is expected that the grating spacing will be reduced by the factor of n, wherein n is the index of refraction of the material. One such important dielectric material is a $GeO_2$ doped optical fiber. In another aspect the invention provides a method of making a Bragg grating comprising providing a transparent or semi-transparent substrate; generating a linearly polarized, pulsed laser beam, said laser beam having a pulse energy exceeding a predetermined energy threshold ($E_{th}$) dependent on the nature of the substrate; bringing said laser beam to a focus within the body of said transparent or semi-transparent substrate; and scanning said transparent or semi-transparent substrate with said linearly polarized laser beam along a scanning path to create sub-diffraction limit structures comprising periodic slabs of modified material oriented orthogonal to the direction of the laser polarization and extending along said scanning path in said transparent or semi-transparent substrate.

In one embodiment, the scanning can be performed using sequential laser writing to increase the width of the grating. This can be achieved by making multiple passes, preferably with some degree of overlap of the periodic nanostructures, for example, 50-70% between the scans in order to lock the periodic nanostructures together in phase and with the grating nanoslabs spatially synchronized.

The term light as used herein refers to wavelengths that are suitable for defining structures by optical means and includes ultra-violet light, visible and near-infra-red light.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
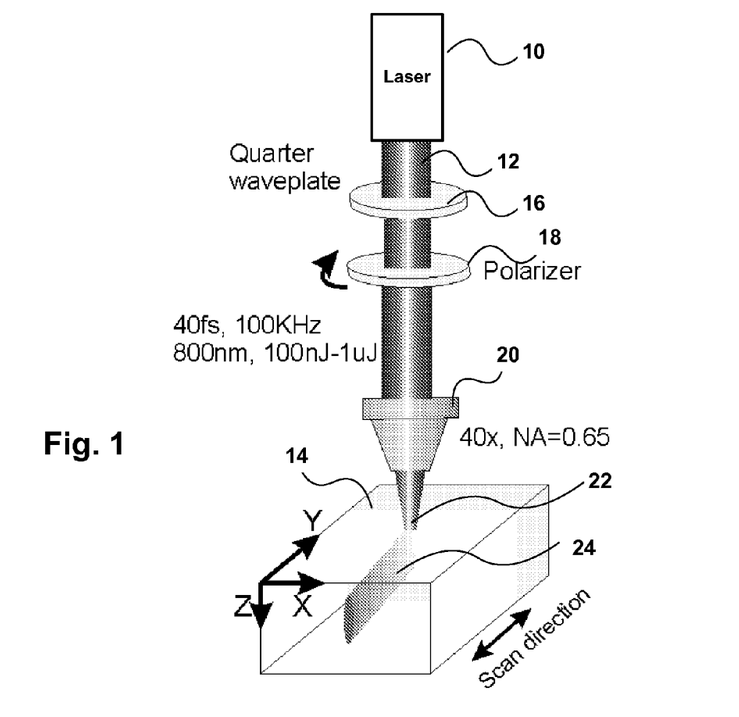
FIG. 1 shows an experimental arrangement for producing long-range ordered nanostructures in dielectrics.

An apparatus for producing high quality long-range periodic sub-diffraction limit nanostructures using FLDM in accordance with one embodiment of the invention is shown in FIG. 1. This apparatus comprises a Ti:sapphire near-infrared femtosecond laser 10 generating laser beam 12, which is directed onto a transparent substrate 14 of fused silica. Other configurations for laser writing such as longitudinal excitation (scan direction is parallel to the light propagation direction) can also be used. It is also possible to overlap consecutive writing beams to create a wider region of grating-like slabs. As mentioned previously the degree of overlap should be approximately 50-70% of the width of the original laser written single-pass modified region. Such overlap is necessary so that the sub-wavelength periodicity of the first laser written modified region is transferred or imposed coherently onto the second laser modified region etc. so that the broader modified region has a single periodicity and the grating slabs in the different written zones are spatially synchronized.

Figure 2:
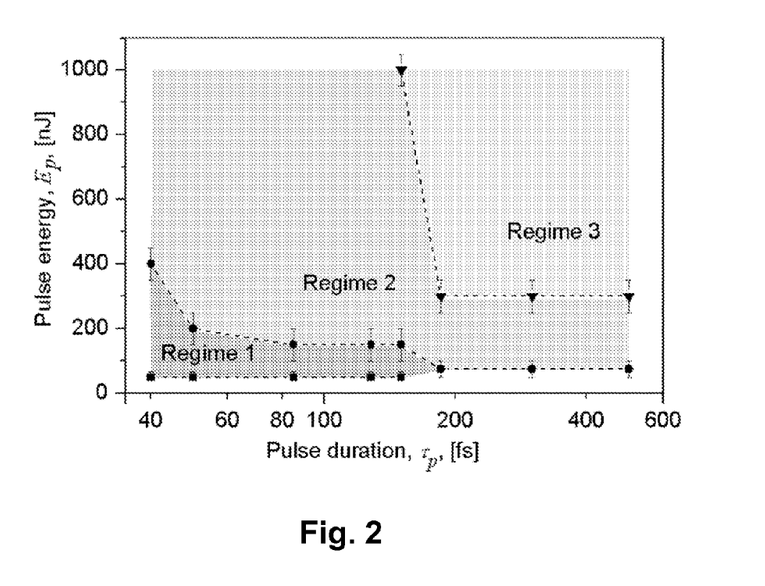
FIG. 2. Threshold pulse energies for different regimes of FLDM in fused silica. $E_p$'s between ■ and ● (Regime 1) produce smooth modification, Ep's between ● and ▼ (Regime 2) produce nanogratings, $E_p$'s above ▼ (Regime 3) produce complex morphology comprising of disrupted regions, nanogratings and smooth modification.

FIG. 2 shows that the threshold for uniform modification (regime 1) occurs at ≈50 nJ for pulse durations up to 160 fs. For pulse durations longer than this, only grating-like structures occur (regime 2). FIG. 2 also defines a pulse energy-pulse duration parameter space where the modified structures show complicated morphology comprising of disrupted regions, nanogratings and uniform modification (regime 3). Pulse durations shorter than about 50 fs produce periodic nanostructures with more inter-slab modification while pulse durations greater than 200 fs produce reasonably well defined slabs but with more disruptive modification occurring in between the modified slabs. The nanoslabs also show deterioration in straightness and regularity at the longer pulse durations. FIG. 2 shows that the short laser pulse durations (≦50 fs) have a progressively higher E/pulse threshold for nanostructure formation. FLDM operation below this threshold prevents the formation of nano-scale sub-structures. Since the nanostructures produce optical loss by means of scattering removal of them is an important result that can lead to a process for improving FLDM written optical waveguides.

The laser beam, which has a nominal repetition rate of 100 KHz, a wavelength of 800 nm and an energy per pulse range of 25 nJ-1 µJ, is passed through a quarterwave plate 16 and a polarizer 18 to produce a beam of linearly polarized light. The polarizer 18 can be any type of suitable polarizer.

The laser beam is then passed through a microscope objective lens 20, in this embodiment having a power of 40×, and a numerical aperture of 0.65 to bring the beam to a focus 22 in the body of the substrate 14. High quality grating nanostructures have been observed in fused silica using NA's in the range 0.45-0.65 but not for NA's well outside of this range e.g. low NA's of 0.2 or high NA's of 0.9. The focusing device can be any optic such as a parabolic mirror, axicon, spherical or cylindrical lens that can be used to achieve a suitable beam focus. A microscope objective together with a cylindrical lens can be used to increase the width of the modified volume transverse to the direction of light propagation (x). The focus is scanned in the Y direction within the substrate. This can be achieved by mounting the substrate on a motorized translation stand (not shown) or of course similarly mounting the optics controlling the femtosecond laser beam 20 on a suitable translation mechanism. The scan rate and laser repetition rate are important parameters. Slow scan rates of say 1-30 µms/s and high repetition rates (100 KHz) enhance the sharpness of the modified periodic regions and decrease the degree of modification between the grating like structures. The scan rate and repetition rate can also be used to alter the nanostructure periodicity in the top part (e.g. first 5 ums) of the modified region. At a repetition rate of 100 KHz lowering the scan rate from 990 µm/s to 1 µm/s decreases the mean spacing from 600 nm to 150 nm. This can also be accomplished at higher laser repetition rates and higher scan rates.

Periodic nanostructure formation is sensitive to irradiation conditions other than pulse duration and scan rate. It will be appreciated that other sets of parameters including numerical aperture of the lens, laser wavelength and repetition rate, and laser pulse energies are important for the optimization of sub-diffraction limit nanostructures.

The co-ordinate axis defined in FIG. 1 is also used in subsequent figures.

The applicants have observed that, with linearly polarized laser light, in one example the modification consists of slabs of modified material, <20 nm thick, orthogonal to the laser polarization and extending for most of the full length of the laser focus. The threshold energy to produce these slabs was ≈150 nJ. The threshold was determined by using a ultrahigh spatial resolution selective chemical etching plus AFM technique to map out the morphology of the modified zones showing the transition from uniform modification to the production of grating-like planes ("*Ultra-high resolution index of refraction profiles of femtosecond laser modified silica structures*" Taylor R. S., Hnatovsky C., Simova E., Rayner D. M., Mehandale M., Bhardwaj V. R. and Corkum P. B., *Optics Express*, 11,775-781, (2003).). The resolution of the technique is 20 nm as determined by the AFM probe tip sharpness. Scanning electron microscopy (SEM) images of weakly etched, 50 fs laser pulse duration, fabricated grating structures reveals slab thicknesses as small as 5 nm. These modified zones can be etched in a conventional manner using diluted hydrofluoric acid (HF) to produce cavities within the body of the substrate.

Figure 3:
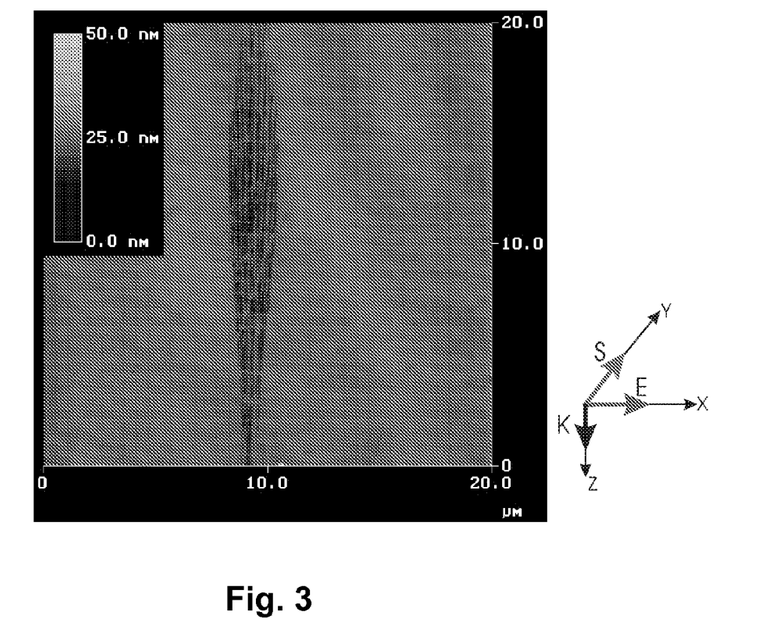
FIG. 3 is a cross-sectional (x-z) atomic force microscopy (AFM) image of an etched tapered modified structure obtained using a laser pulse energy of 250 nJ and with the laser polarization perpendicular to the laser writing direction.
Figure 4:
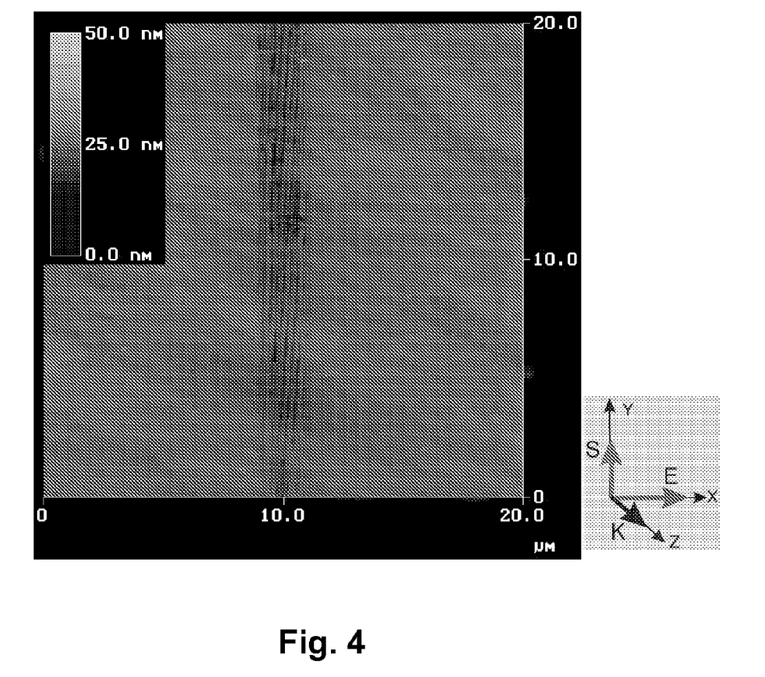
FIG. 4 is an AFM image in the x-y plane of an etched grating structure obtained with a laser pulse energy of 400 nJ and with the laser polarization perpendicular to the writing direction.
Figure 5:
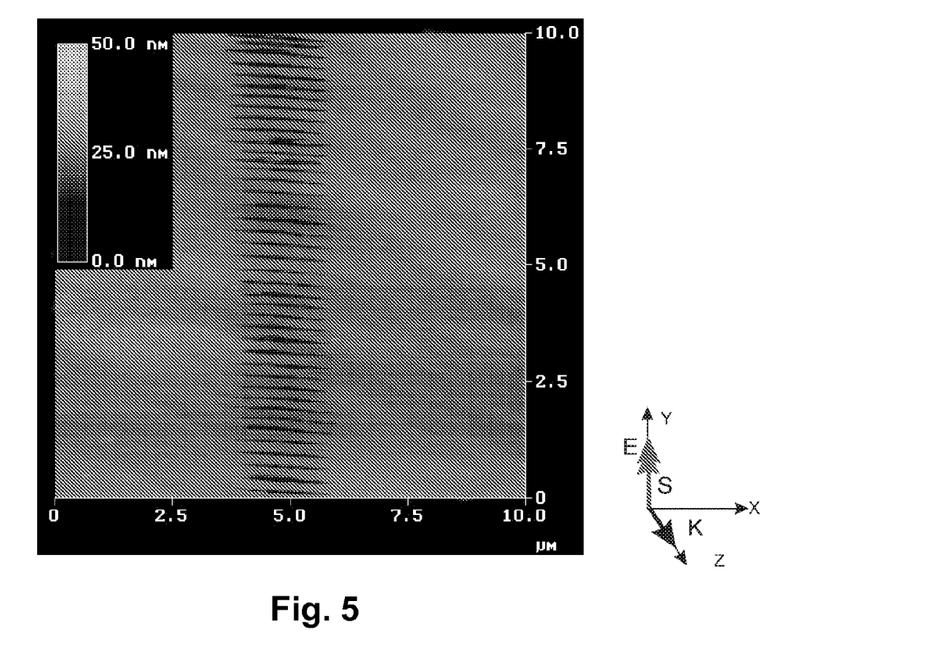
FIG. 5 is an AFM image in the x-y plane of an etched grating structure obtained with a laser pulse energy of 300 nJ and with the laser polarization parallel to the writing axis.

The weakly etched slabs revealed by the above mentioned AFM technique are shown in FIG. 3 as dark lines and are a cross-sectional (x-z) image of a tapered modified structure obtained using a laser pulse energy of 250 nJ and with the laser polarization perpendicular to the laser scanning direction, also referred to as the writing direction. The lens numerical aperture in this case was 0.45. A top view (x-y plane) of the lines shown in FIG. 3 is presented in FIG. 4 but with a laser pulse energy of 400 nJ. The individual planes of modification extend for many microns before alternative planes slightly offset from the first planes emerge. When the laser pulse energy is close to the threshold for periodic nanostructure formation the number of planes (FIGS. 3 and 4) can decrease to one. In this case a single narrow (<10 nm) nanoplane can be written in 3-D. FIG. 5 shows an AFM image also in the x-y plane of an etched grating structure obtained with a laser pulse energy of 300 nJ but with the laser polarization parallel to the writing axis. The lens numerical aperture in this case was 0.65. In the case of FIG. 5, the laser polarization direction is collinear with the writing direction, and long range ordered arrays again normal to the polarization direction were still produced regardless of the near continuous (steps of <1 nm between laser pulses) motion of the sample which might be expected to wash out and destroy the structures. In fact, the applicants have found that a feed-back mechanism operates to allow the self-replication of the nanostructures allowing them to survive despite the sample moving relative to the focus.

Figure 6:
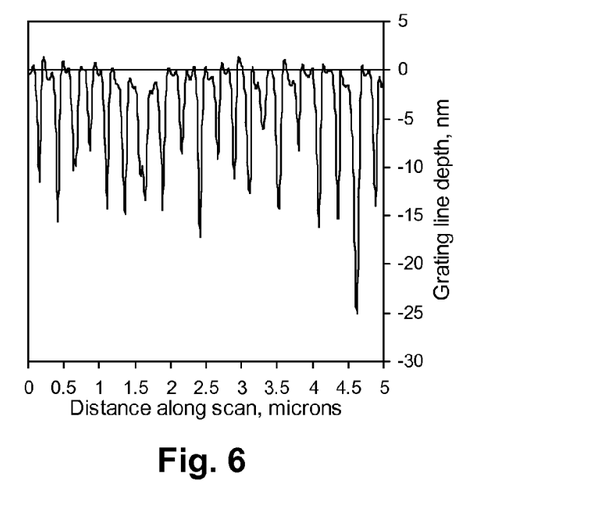
FIG. 6 is an AFM section analysis (y-direction) through the center of the grating planes shown in FIG. 5.

As demonstrated by FIG. 6, the feed-back mechanism produces sharply defined structures (shown as dips in the AFM section analysis) with very little modification to the material occurring between the sharply defined structures (i.e. the section analysis line depth returns to near zero).The applicants have determined that the degree of etching of material which has been uniformly modified correlates with the magnitude of the induced refractive index changes (Taylor et al, Optics Express,11,775-781,(2003)) and that these index changes are in the order of $5\times10^{-3}$. The small degree of modification in between the nanostructures implies that the index of refraction in this region is very similar to the index in the unmodified, unirradiated zones. The grating slabs, as viewed in the x-y plane evolve from uniform, continuous modification along the scan direction (y) at low pulse energies into circular zones as the energy/pulse is increased. These zones then collapse into grating-like slabs at slightly higher pulse energies. As mentioned previously SEM images of weakly etched grating slabs indicated that the AFM image resolution was probe tip limited to approximately 20 nm and that the thickness of the slabs can be as small as 5 nm. We have confirmed using a cleaved and unetched sample that the nano-slabs are in the form of planar nano-cracks. Nanocracks should result in large index changes between the modified and unmodified regions making it suitable for grating applications.

Figure 7:
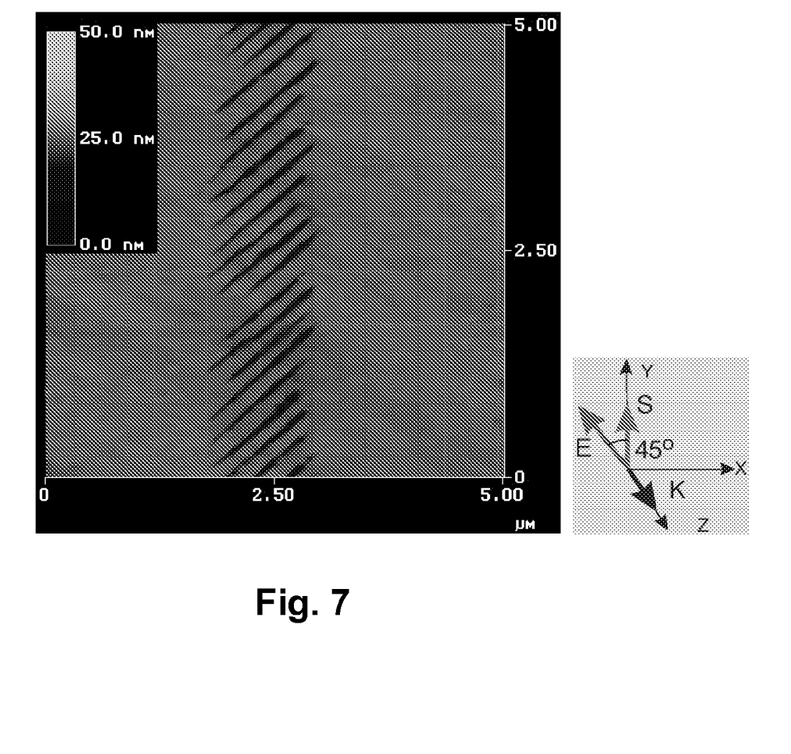
FIG. 7 is an AFM image in the x-y plane of an etched grating structure obtained with a laser pulse energy of 300 nJ and with the laser polarization 45° to the scan axis.
Figure 8:
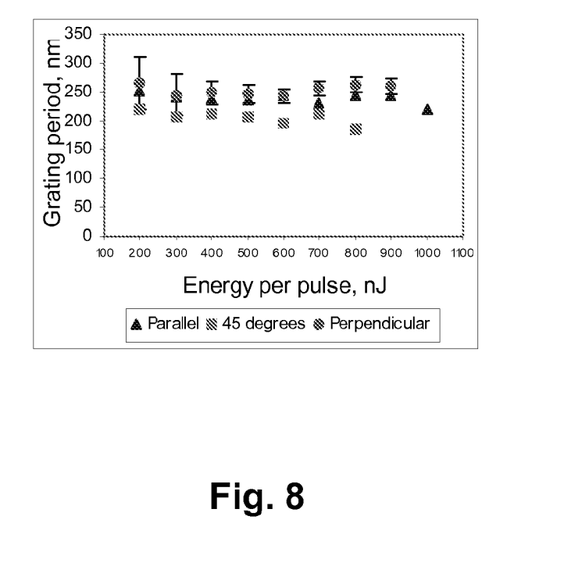
FIG. 8 is a graph of the grating spacings as a function of the laser pulse energy for three linear polarizations perpendicular (●), parallel (▲) and 45° (■) to the laser writing direction.

It has also been observed that the orientation of the embedded nanostructures can be controlled by the angle between the light polarization, the writing direction and the direction of laser propagation. FIG. 7 shows an AFM image in the x-y plane of an etched grating structure obtained with a laser pulse energy of 300 nJ and with the laser polarization 45° to the scan axis. One can see that the modified regions are at approximately 45° to the scan direction and again normal to the polarization angle shown in FIG. 7. The numerical aperture of the lens in this embodiment is 0.65. FIG. 8 is a graph of the grating spacing as a function of the laser pulse energy for three linear polarizations perpendicular (●), parallel (▲) and 45° (■). One observes that the spacing is insensitive to laser pulse energy once the energy is above a well defined threshold, so that fluctuations in the laser energy will produce minimal changes to the periodicity. The ≈250 nm spacing corresponds roughly to $\lambda/2n=270$ nm. This behaviour is very different to that claimed by Shimotsuma et al (Phys. Rev. Lett., 91,247405-1 (2003)) who showed that the spacing inside their static focal volume increased with higher energy/pulse. We believe that their experimental observations were not representative and since their model gave good agreement with their experimental data, serious doubt is cast onto the validity of their model.

Once the material modification has been achieved, chemical etching, for example using HF or other chemical etchants can be applied to produce ordered arrays of narrow (20-100 nm thick) slots that can be several μm deep and spaced by ≈$\lambda/2n$. The separation of the modified regions and therefore the separation of the slots can be reduced or increased in approximate linear fashion with a reduction or increase in the laser wavelength, respectively.

Figure 9:
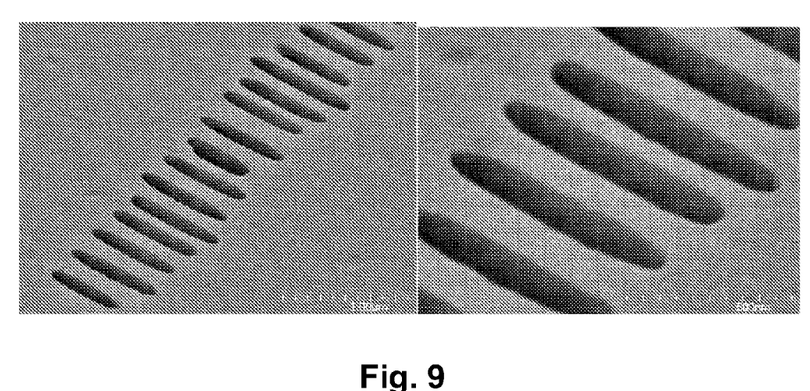
FIG. 9 shows SEM images of nanostructures after 4 minutes of etching in 1% HF showing arrays of nano-slots.
Figure 10:
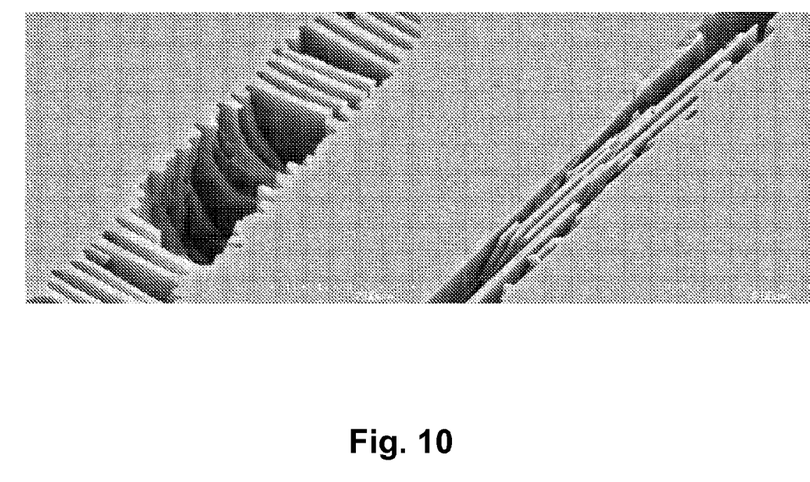
FIG. 10 is a SEM image of nano-slot formation after 20 minutes of etching in 1% HF for the laser polarization parallel (left image) and perpendicular to the writing direction (Many of the slots show mechanical disruption induced by ultrasonic cleaning)

FIGS. 9 and 10 show SEM images of such nano-slots after extended etching. By controlling the laser polarization it is possible to control the orientation of the slots. This leads to polarization selective etching and improved fabrication of micro-fluidic channels. For example, the applicants have demonstrated that one can obtain highly preferential etching (×70) of channels formed parallel to the sample surface, if the laser polarization is perpendicular to the scan direction relative to etching with the polarization parallel to the scan direction. This is the result of etchant rapidly penetrating for many microns along the highly modified slabs in the scan direction for the perpendicular polarization case (right image in FIG. 10) allowing simultaneous etching of the unmodified material between the slabs to occur in a parallel etching fashion. When the polarization is parallel to the scan direction etching occurs rapidly through the modified regions but then must etch each slow to etch unmodified zone in serial fashion (left image in FIG. 10).

The applicants have constructed their own model to describe the formation process for long-range periodic nanostructures (V. R. Bhardwaj et al, Phys. Rev. Lett.,96,057404, 2006). The model consists of three parts; (1) laser-induced ionization of the dielectric medium and the formation of randomly spaced nanoplasmas, (2) growth of the nanoplasmas into nanoplanes (slabs), orthogonal to the laser polarization, due to local electric field enhancements, (3) ordering of nanoplanes due to optical mode coupling. The model starts off with a laser produced plasma via multiphoton ionization. It is assumed that localized randomly spaced "hot" plasma spots grow into what are initially underdense ($N_e<N_{cr}$) nanoplasmas. Due to local field enhancement near the plasma caused by the response of the plasma to the laser's electromagnetic field, further ionization is preferentially localized where the field is enhanced and the plasmas elongate into ellipsoids along the direction of light propagation and perpendicular to the laser polarization direction. The plasmas continue to absorb laser radiation causing local material modification such as defects or colour centers which lower the effective band-gap of the dielectric material making it more likely to absorb subsequent laser photons ie. creation of a pulse to pulse memory.

Above a certain laser pulse energy threshold and for laser pulse durations sufficiently long to permit full plasma development over a single laser pulse it is assumed that the nanoplasmas begin to behave like quasi-metallic sheets which can support surface plasmon-polariton modes i.e. electromagnetic waves which travel together with a surface charge density. Multiple sheets can grow within the focal volume, however if two of these plasma sheets start to grow close to each other at distances comparable to the wavelength of light in the dielectric i.e. $\lambda/n$ then the two plasmas can be thought of as forming an optical waveguide. From the theory of metallic waveguides separations of sheets by $<\lambda/2n$ will not support light propagation modes required to feed the plasma sheets further down into the dielectric. With the accumulation of more laser shots the metallic-like sheets of plasma organize themselves to fill the focal volume but keeping nearest neighbor separations at $\geq \lambda/2n$. If the laser scan rate is slow enough and the repetition rate high enough sufficient pulses are delivered to the focal volume to establish well defined and equally spaced (at $\lambda/2n$) grating like slabs of modification. In the early development of the plasma sheets the mode selection rules may not be strictly applicable and sheets with smaller separations than $\lambda/2n$ are possible. Experimentally these are seen in the top part (closest to the lens) of the observed modified structures.

As the sample is scanned under the laser focus organization is transferred to the "new" unmodified material by coupling of the some portion of the focussed light with the existing waveguide mode structure.

The model successfully predicts the main experimental observations described in this patent application including the key observation of long-range replication by means of optical mode-coupling. Above a certain threshold energy the model predicts homogeneous modification due to uniform growth of random nanoplasmas. As the intensity of the laser pulses increase there exists a second threshold above which there is periodic ordering of nanoplanes i.e. once a threshold electron density is reached above which there is pronounced localized electric field enhancement. The model predicts the correct scaling relationship between the periodicity and the laser wavelength (ie linear scaling) and predicts a fixed spacing of $\lambda/2n=270$ nm close to the experimental value of 242 nm for a wide range of laser pulse energies (i.e. energies which correspond to laser intensities above the threshold for field enhancement) at constant scan rate and laser repetition rate. The model qualitatively explains the relationship between the nano-grating periodicity and dosage (No. of laser shots per micron of scan) and the dependence of the threshold for nano-grating formation on laser pulse duration. For example, the model requires that a sufficient number of laser shots per micron of scan be delivered to the material to create a sufficient number of nanoplanes which can be stacked together until the spacing is $\approx\lambda/2n$. In addition before the nanosheets of plasma can act as metallic-like waveguides (occurs near the top of the modified region i.e. towards the focusing optic) periodic spacings $<\lambda/2n$ can occur at high dosages as is observed experimentally. The observation that the threshold for nanograting formation decreases with an increase in pulse duration is consistent with the model and the requirement that sufficient time is required to form the quasi-metallic waveguides over the duration of a single laser pulse. At present the model does not proceed further to describe how the plasma sheets evolve into voids or nanocracks.

Figure 11:
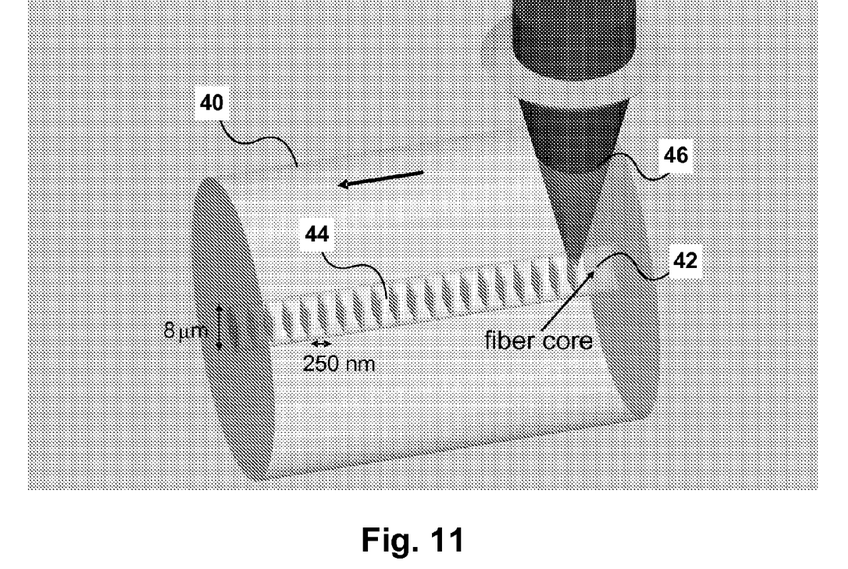
FIG. 11 illustrates a method of making a Bragg grating within a waveguide.

Nanostructures made in accordance with embodiments of the invention may have many applications. Suitable applications include the mask-less direct writing of high-contrast Bragg gratings in optical fibers, variable all-fiber attenuators, fiber taps to measure power levels, fiber polarimeters to measure polarization states and 2 and 3-D photonic devices and the production of photonic crystal materials. As mentioned previously operation of the laser with a pulse energy and with a pulse duration chosen from FIGS. 2 so that the laser intensity is just above the threshold for high quality nanoplane formation allows one to write (case: polarization is perpendicular to the scan direction) a single narrow nanoplane in 3-D. This "nanopen" writing capability allows one to write in 3-D with a resolution of about 10 nm. It should be possible with the "nanopen" to write each grating plane of a Bragg grating with the same 10 nm precision but with any required pitch. Single-nanoplane writing can also be combined with chemical etching to make single nanoslots or nanowires after metalization. Arrays of etched nanowells which intercept a femtosecond laser written optical waveguide could also have application in the area of biochip sensing. Metalization of the ultra-narrow periodic slots can be used to make broadband polarizing beamsplitters or structures for surface enhanced Raman spectroscopy for the label free detection of biomolecules (A. Grow, L. Wood, J. Claycomb and P. Thompson, "New biochip technology for label-free detection of pathogens and their toxins", J. Microbiological Methods, 53,221-233,(2003)). The periodic nanoslots could also be used as templates to stamp impressionable materials. The nanoslots could also be formed in optical fibers and used as biosensors. The use of the laser polarization to control the etch rate of femtosecond laser modified glass will be critical in making 3-D microfluidic channels which can integrate with 3-D waveguides. Variation of the laser polarization might also allow very complicated structures to be etched inside a dielectric. An important application of the invention, shown in FIG. 11, is to form a Bragg grating inside a waveguide. In this case, the waveguide 40 is produced with a core 42, and then the laser beam 46 is brought to a focus within the core 42 to produce the nano-gratings 44 within the waveguide core. A method of producing an all-fiber tap is to produce periodic nano-gratings angled with respect to the direction of propagation of light in the waveguide. These gratings direct a small portion of the light travelling within the waveguide outside the waveguide, where they can be detected.

Figure 12:
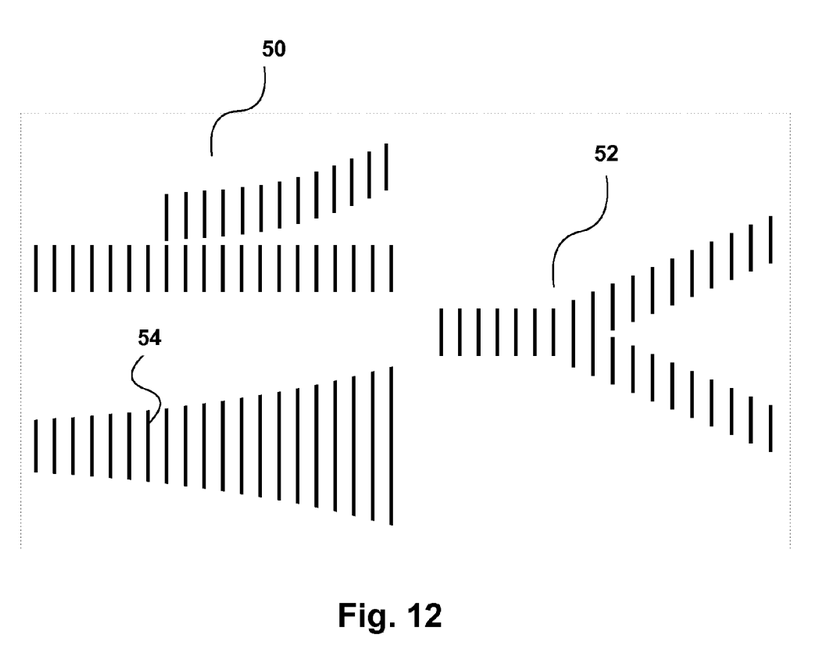
FIG. 12 illustrates how metalized sub-wavelength grating structures could be spatially synchronized and used to fabricate surface plasmon photonic components.

In order to make grating planes matched to the cross-sectional dimensions of single-mode fibers, e.g. for Bragg writing applications, one can coherently link the periodic nanoplanes with multipass operation with an appropriate beam overlap as discussed earlier. Linked metalized nanoslots can also be used in surface plasmon resonance photonic circuits to make miniature couplers 50, splitters 52, and expanders 54 as well as Bragg gratings as shown in FIG. 12. Furthermore it may also be possible to employ embodiments of the invention for the making of rewritable 3-D data storage voxel elements as well as 2-D and 3-D photonic crystal structures for telecom and biological applications. One method for creating periodic nanostructures in 2-D is to create periodic structures with one laser polarization then rescan over the same region with a reduced laser dosage (to avoid erasure of the grating structures) and with a different polarization, e.g., orthogonal to create periodic modified slabs orthogonal to the first set of slabs.

All references referred to herein are incorporated herein by reference.

The invention claimed is:

1. A method of making high quality long-range periodic nanostructures in a transparent or semi-transparent substrate, comprising:
    generating a linearly polarized, pulsed femtosecond high repetition rate laser beam, said laser beam having an energy per pulse exceeding a predetermined energy threshold ($E_{th}$) that is dependent on the nature of the substrate
    bringing said laser beam to a focus within the body of said transparent or semi-transparent substrate; and
    scanning said transparent or semi-transparent substrate with said linearly polarized laser beam along a scanning path to create sub-diffraction limit structures comprising periodic slabs of modified material oriented orthogonal to the direction of the laser polarization and extending along said scanning path in said transparent substrate.

2. A method as claimed in claim 1, wherein said laser beam has a pulse duration inside the material between about five fs and 200 fs.

3. A method as claimed in claim 1, wherein said substrate is fused silica and said energy is in the range of the energy threshold ($E_{th}$) to $4 \times E_{th}$.

4. A method as claimed in claim 1, wherein the plane of polarization is perpendicular to said scanning direction.

5. A method as claimed in claim 1, wherein the plane of polarization is collinear with said scanning direction.

6. A method as claimed in claim 1, further comprising etching said modified material to provide sub-diffraction limit cavities.

7. A method as claimed in claim 1, comprising varying the wavelength of said laser to control the spacing of said slabs.

8. A method as claimed in claim 1, comprising varying the polarization of said laser beam to form complex structures within said substrate.

9. A method as claimed in claim 1, wherein said slabs are produced with a harmonic wavelength of said laser beam.

10. A method as claimed in claim 1, comprising controlling the orientation of the nanostructures by varying the angle between at least two directions selected from the group consisting of: the direction of light polarization, the scanning direction and the direction of laser propagation.

11. A method as claimed in claim 1, wherein said path is linear.

12. A method as claimed in claim 1, wherein said path is curved to produce 3-D shapes of modified material within said substrate.

13. A method as claimed in claim 1, wherein said laser beam is passed through a lens to bring said beam to a focus in the body of said transparent material.

14. A method as claimed in claim 1, wherein the substrate is scanned at a rate less than 100 μm/s.

15. A method as claimed in claim 1, wherein the rate of scanning the substrate is varied to alter said structures.

16. A method as claimed in claim 1, further comprising re-scanning said sub-diffraction limit structures with said linearly polarized laser beam having a different polarization direction from the polarization direction in said scanning step to create 2-D photonic crystal structures.

17. A method as claimed in claim 16, wherein said polarization direction during said re-scanning step is orthogonal to said polarization direction in said scanning step.

18. A method as claimed in claim 1, wherein the energy per pulse is in the range of 75 to 300 nJ.

19. A method as claimed in claim 1, wherein the energy per pulse lies in the range 75 nJ-300 nJ, the pulse duration lies in the range of five fs-200 fs, the scan rate is <100 μm/s, and the repetition rate is less than or equal to about 250 KHz.

20. A method as claimed in claim 1, wherein the laser polarization is perpendicular to the scan direction so as to produce nanoplanes oriented parallel to the scan direction.

21. A method as claimed in claim 1, wherein the laser pulse energy is just above the threshold for nanoplane formation so that a single nanoplane is produced.

22. A method as claimed in claim 6, wherein said etched sub-diffraction limit cavities are metalized to provide surface plasmon elements.

23. A method as claimed in claim 1, wherein the laser pulse energy is greater than about 10× the threshold for uniform modification and the substrate surface is polished down to <10 microns from the top of the modified structures to form a well-defined nanocrack emanating from the apex of the modified structures to connect to the surface and following the path of the writing beam.

24. A method as claimed in claim 1, which is used to make arbitrary shaped three dimensional objects in glass.

25. A method as claimed in claim 1, further comprising re-irradiating said sub-diffraction limit structures with a second linearly polarized laser beam having a different polarization from the first polarization direction to erase the first grating structures and replace them with a second set of grating structures oriented perpendicular to the laser polarization of the rewriting beam.

26. A method as claimed in claim 1, wherein said scanning is performed with side by side linearly polarized laser beams to increase the width of said structures.

27. A method as claimed in claim 26, wherein said side by side scanning is performed sequentially with multiple passes in the scanning direction, and with overlap between each scan in order to lock the periodic nanostructures together in phase and form spatially synchronized nanoslabs.

28. A method as claimed in claim 26, wherein there is about 50-70% overlap between the scans.

29. A method of making a Bragg grating comprising:
providing a transparent or semi-transparent substrate;
generating a linearly polarized, pulsed laser beam, said laser beam having a pulse energy exceeding a predetermined energy threshold ($E_{th}$) that is dependent on the nature of the substrate;
bringing said laser beam to a focus within the body of said transparent or semi-transparent substrate; and
scanning said transparent or semi-transparent substrate with said linearly polarized laser beam along a scanning path to create sub-diffraction limit structures comprising periodic slabs of modified material oriented orthogonal to the direction of the laser polarization and extending along said scanning path in said transparent or semi-transparent substrate.

30. A method as claimed in claim as in 29, wherein the laser pulse duration lies in the range of about a five fs-200 fs.

31. A method as claimed in claim 30, wherein the laser pulse energy lies in the range of $E_{th}$ to $4 \times E_{th}$.

32. A method as claimed in claim 29, wherein said scanning is performed with side by side linearly polarized laser beams to increase the width of the grating.

33. A method as claimed in claim 32, wherein said side by side scanning is performed sequentially with multiple passes in the scanning direction, and with overlap between each scan in order to lock the periodic nanostructures together in phase and form spatially synchronized grating nanoslabs.

34. A method as claimed in claim 32, wherein there is about 50-70% overlap between the scans.

35. A method of making a Bragg grating inside a waveguide, comprising:
providing an optical waveguide with a core, said optical waveguide having a propagation direction;
generating a linearly polarized, pulsed laser beam, said laser beam having a pulse energy exceeding a predetermined energy threshold ($E_{th}$) dependent on the nature of the substrate;
bringing said laser beam to a focus within said core; and
scanning said core with said linearly polarized laser beam along the propagation direction of the waveguide to create sub-diffraction limit structures comprising periodic nano-gratings oriented orthogonal to the direction of the laser polarization and extending along said propagation direction.

36. A method as claimed in claim 35, wherein said laser beam has a pulse duration between about five fs-200 fs.

37. A method as claimed in claim 36, wherein said laser beam has an energy range between $E_{th}$ and $4 \times E_{th}$.

38. A method as claimed in claim 36, comprising controlling the laser wavelength is used to vary the spacing of the nano-gratings.

39. A method as claimed in claim 36, comprising varying the number of laser shots per micron of scan to vary the spacing of the periodic nano-gratings.

40. A method as claimed in claim 35, wherein said sub-diffraction limit structures are sub-wavelength periodic gratings that provide controlled optical scattering to form a waveguide attenuator.

41. A method as claimed in claim 35, wherein said periodic nano-gratings are angled with respect to the direction of propagation of light in the waveguide are produced near or in the core region to fabricate a tap which directs a small portion of the light travelling in the waveguide out of the guide where it can be detected.

42. A method as claimed in claim 35, further comprising determining the polarization state of light propagating in the waveguide by using said sub-wavelength periodic structures.

43. A method of making connected nanovoids in a transparent or semi-transparent substrate, comprising:
generating a circularly polarized pulsed laser beam or a linearly polarized beam with the laser polarization perpendicular to the scan direction, said laser beam having an energy exceeding a predetermined energy threshold for nanovoid formation dependent on the nature of the substrate;

bringing said laser beam to a focus within the body of said transparent or semi-transparent substrate; and scanning said transparent or semi-transparent substrate with said circularly or linearly polarized laser beam along a scanning path to induce material modification with the formation of connected sub-diffraction limited nanovoid structures.

44. A method of processing a transparent substrate, comprising:

generating a pulsed polarized laser beam having a pulse duration less about 50 fs and having an energy exceeding a predetermined energy threshold for the onset of uniform modification but less than a predetermined energy threshold for periodic nanostructure formation dependent on the nature of the substrate;

bringing said laser beam to a focus within the body of said transparent substrate; and scanning said transparent substrate with said polarized laser beam along a scanning path to induce uniform material modification without the formation of sub-diffraction limit nanostructures or to remove such nanostructures present in said substrate.

45. A method as claimed in claim 44, wherein said laser beam is circularly polarized.

* * * * *